(12) United States Patent
de Arroyabe

(10) Patent No.: US 10,046,654 B2
(45) Date of Patent: Aug. 14, 2018

(54) BATTERY SYSTEM

(71) Applicant: Bayerische Motoren Werke Aktiengesellschaft, Munich (DE)

(72) Inventor: Jose Lopez de Arroyabe, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 861 days.

(21) Appl. No.: 13/946,005

(22) Filed: Jul. 19, 2013

(65) Prior Publication Data

US 2013/0300342 A1    Nov. 14, 2013

Related U.S. Application Data

(63) Continuation of application No. PCT/EP2012/001059, filed on Mar. 9, 2012.

(30) Foreign Application Priority Data

Mar. 25, 2011   (DE) .................. 10 2011 006 160

(51) Int. Cl.
   | | |
   |---|---|
   | *H02J 7/00* | (2006.01) |
   | *B60L 11/18* | (2006.01) |
   | *H01M 10/42* | (2006.01) |
   | *H01M 10/46* | (2006.01) |

(52) U.S. Cl.
   CPC ....... *B60L 11/1811* (2013.01); *B60L 11/1866* (2013.01); *H01M 10/425* (2013.01); *H01M 10/4207* (2013.01); *H01M 10/465* (2013.01); *H02J 7/0016* (2013.01); *H02J 7/0055* (2013.01); *B60L 2210/40* (2013.01); *B60L 2240/547* (2013.01); *B60L 2240/549* (2013.01); *Y02T 10/7005* (2013.01); *Y02T 10/7055* (2013.01); *Y02T 10/7061* (2013.01); *Y02T 10/7241* (2013.01)

(58) Field of Classification Search
   USPC .................................... 320/118, 101
   See application file for complete search history.

(56) References Cited

U.S. PATENT DOCUMENTS 6,538,414 B1 *  3/2003  Tsuruga et al. ............... 320/119
7,804,276 B2    9/2010  Roessler
(Continued)

FOREIGN PATENT DOCUMENTS

| CN | 101783525 A | 7/2010 |
|---|---|---|
| DE | 10 2008 021 090 A1 | 11/2008 |
| DE | 10 2008 016 957 A1 | 10/2009 |

(Continued)

OTHER PUBLICATIONS

Chinese Office Action dated Dec. 29, 2014 with English language translation (Thirteen (13) pages).

(Continued)

*Primary Examiner* — Robert Grant
(74) *Attorney, Agent, or Firm* — Crowell & Moring LLP

(57) ABSTRACT

A battery system has battery cells, a transformer which has a first winding which can be connected parallel to the cell arrangement, and a plurality of second windings. Each second winding can be connected parallel to one of the battery cells. The transformer includes a third winding, which is provided for feeding energy from an external energy source to the battery system.

17 Claims, 1 Drawing Sheet

(56) References Cited

U.S. PATENT DOCUMENTS

2008/0143292 A1* 6/2008 Ward .......................... 320/101
2010/0181963 A1 7/2010 Schreiber

FOREIGN PATENT DOCUMENTS

| DE | 10 2008 023 292 A1 | 12/2009 |
| DE | 10 2009 033 514 A1 | 1/2011 |
| EP | 0 432 639 A2 | 6/1991 |
| EP | 2 209 180 A1 | 7/2010 |
| WO | WO 2009/121576 A2 | 10/2009 |
| WO | WO 2009/138956 A1 | 11/2009 |
| WO | WO 2011/007329 A2 | 1/2011 |

OTHER PUBLICATIONS

Chinese-language Office Action dated Jul. 9, 2015, with English translation (Thirteen (13) pages).
C. Bonfiglio et al.: "A cost optimized battery management system with active cell balancing for lithium ion battery stack", Vehicle Power and Propulsion Conference, Piscataway, NJ, USA Sep. 7, 2009, pp. 304-309, XP031637853.
Werner Roebler, Active Charge Balancing for Lithium-Ion Batteries, Journal ATZ Elektronik Feb. 2008, pp. 62-66.
International Search Report dated Jun. 11, 2012 w/ English translation (six (6) pages).
German-language Office Action dated Jan. 19, 2012 (five (5) pages).

* cited by examiner

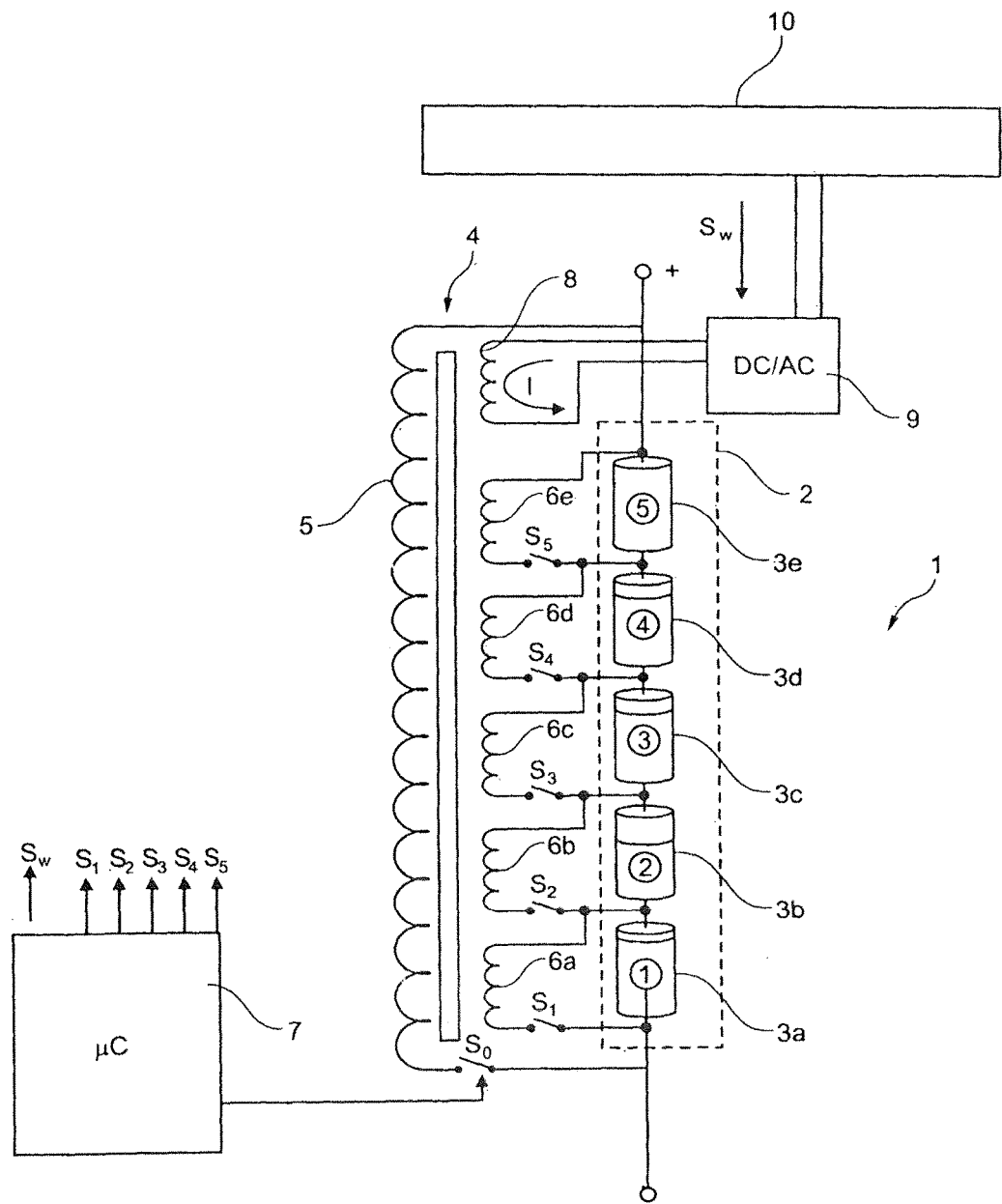

BATTERY SYSTEM

CROSS REFERENCE TO RELATED APPLICATIONS

This application is a continuation of PCT International Application No. PCT/EP2012/001059, filed Mar. 9, 2012, which claims priority under 35 U.S.C. § 119 from German Patent Application No. 10 2011 006 160.6, filed Mar. 25, 2011, the entire disclosures of which are herein expressly incorporated by reference.

BACKGROUND AND SUMMARY OF THE INVENTION

The present invention relates to a battery system and, more particularly, to a battery system for a motor vehicle having a cell arrangement including several battery cells connected in series, and a transformer having a first winding, which is connectable in parallel with the cell arrangement and several second windings, each second winding being connectable in parallel with one of the battery cells.

A known battery system of the above-type is described in the document entitled "Active Charge Balancing for Lithium-Ion Batteries", which was published in the journal ATZ Elektronik February 2008, Year 3, Pages 62-66 and authored by Werner Rößler (the "Rößler reference").

Battery systems of hybrid vehicles have a plurality of battery cells connected in series. It is known that, for obtaining a service life that is as long as possible, the charging state level of the battery cells should be maintained in a certain range. If a battery is overcharged, i.e. the charging state level rises above a predefined value, or if the battery is excessively discharged, i.e. the charging state level falls below a predefined value, such overcharging or excessive discharging has a very negative impact on the service life of the battery.

In the above-mentioned Rößler reference, a battery system is described in the case of which, by means of a transformer device controlled by an electronic battery management system, an active charge balancing can be carried out between individual battery cells of the battery system that are connected in series. The term "active charge balancing" means that energy is "displaced" between the cells as soon as the voltage of a battery cell deviates too far from the average voltage of the battery cells that are connected in series. A corresponding circuit arrangement is illustrated on page 64 of the Rößler reference. The transformer arrangement, by which the active charge balancing is carried out, has a first winding which is connected in parallel with the cell arrangement formed by the battery cells, which cells themselves are connected in series. Furthermore, several second windings are provided, in which case each such second winding is connected in parallel with the battery cells that are connected in series. One switch respectively constructed as a MOSFET is assigned to the first winding and each second winding. The switches are triggered by an electronic battery management system.

Basically, there are two cases in which charge balancing is to be carried out They are called "bottom balancing", on the one hand, and "top balancing", on the other hand.

"Bottom balancing" takes place when the charging state level of one of the battery cells connected in series has fallen below a permissible value. In this case, the "weak battery cell" has to be charged. For this purpose, the switch assigned to the first winding is closed, which has the result that the transformer is magnetically charged from the entire battery block. After the switch assigned to the first winding has been opened again, the magnetic energy stored in the transformer can be displaced in a targeted manner into the "weak battery cell", in that the switch assigned to this cell is closed.

"Top balancing" takes place when the charging state level of one of the battery cells connected in series exceeds a predefined value. In this case, the switch assigned to the "overcharged battery cell" is closed, which has the result that the transformer is charged by way of the second winding assigned to the overcharged battery cell. Subsequently, this switch is opened and the switch assigned to the first winding is closed. The energy stored in the transformer and supplied by the overcharged battery cell will then be fed by way of the first winding back into the entire cell arrangement formed by the individual battery cells connected in series.

Such a charge balancing can be carried out very effectively, i.e. with a high frequency.

It is an object of the invention to further develop the battery system, which is known from the state of the art and permits an active charge balancing, particularly such that it can be charged from the outside in a simple manner.

This and other objects are achieved by a cell arrangement including several battery cells connected in series, and a transformer having a first winding, which is connectable in parallel with the cell arrangement and several second windings, each second winding being connectable in parallel with one of the battery cells. The transformer includes a third winding which is provided for feeding energy from an external energy source to the battery system.

The starting point of the invention is a battery system having a cell arrangement, which arrangement has several battery cells connected in series, and a transformer which permits an active charge balancing between the individual battery cells. For this purpose, the transformer has a first winding which can be connected in parallel with the entire cell arrangement, and several second windings, each of which is connectable in parallel with one of the battery cells.

According to the invention, the transformer is expanded by an additional winding, which in the following will be called a third winding. The third winding is provided for feeding energy from an external energy source. As an example, the external energy source may be a solar cell arrangement.

Such a battery system would be suitable for use in a vehicle, particularly a hybrid vehicle or in a purely electric vehicle. It is contemplated to provide the solar cell arrangement on an exterior side of a vehicle body component, for example, on a vehicle roof and to use it for charging the battery system.

According to a further aspect of the invention, the battery system has a "high-voltage cell arrangement" with an operating voltage of more than 300 volt. Such systems are particularly suitable for applications in hybrid or electric vehicles.

It is, in principle, also possible to feed the electric energy supplied by a solar cell arrangement directly into the cell arrangement or into individual battery cells and not by way of a transformer as described herein. However, in the case of high-voltage batteries, since they are used in hybrid or electric vehicles, this is not acceptable for safety reasons. In the case of vehicles with high-voltage batteries, for safety reasons, a galvanic separation is required between a "high-voltage area" and a "low voltage area" of the electric system.

A further advantage of the invention is the fact that a transformer arrangement provided for an active charge balancing can be expanded at comparably low expenditures by a "third winding", by way of which energy can be fed from an external energy source.

As an alternative to a solar cell arrangement, electric energy could also be fed into the battery system from another energy source. Peltier elements, for example, could be considered, which utilize the thermal energy contained in the exhaust gas of an internal-combustion engine for generating electric current and feeding the latter by way of the third winding into the battery system.

Research has shown that, by means of currently available solar cells and a solar surface of the size of a conventional car roof, under solar radiation conditions, as they occur in Central Europe for example, energy of approximately 600 wh a day can be generated, whereby at least several starting operations of an internal-combustion engine can be carried out, or an average vehicle can be accelerated several times from a stationary position to a speed of approximately 50 km/h.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 illustrates a battery system according to an embodiment of the invention.

DETAILED DESCRIPTION OF THE DRAWING

FIG. 1 illustrates a battery system 1 having a cell arrangement 2, which cell arrangement is formed by several battery cells 3a, 3b, 3c, 3d, 3e connected in series. Furthermore, a transformer 4 is provided. The transformer 4 has a first winding 5, which can be connected by closing a switch $S_0$ in parallel with the entire cell arrangement 2. In addition, several second windings 6a-6e are provided. One second winding 6a-6e, respectively, is assigned to each of the battery cells 3a-3e. Thus, the second winding 6a is assigned to the battery cell 3a; the second winding 6b is assigned to the battery cell 3b; the second winding 6c is assigned to the battery cell 3c; the second winding 6d is assigned to the battery cell 3d; and the second winding 6e is assigned to the battery cell 3e. By closing a switch $S_1$, $S_2$, $S_3$, $S_4$, $S_5$ assigned to it, each of the second windings 6a-6e can be connected in parallel with the battery cell 3a-3e assigned to the respective second winding 6a-6e.

The switches $S_0$, $S_1$-$S_5$ may be semiconductor devices, such as MOSFETs. The switches $S_0$, $S_1$-$S_5$ can be switched in a controlled manner by way of an electronic battery management system 7.

The transformer 4 further has a third winding 8, which is electrically connected with an external energy source 10 by way of a DC/AC converter 9. The external energy source 10 may be a solar cell arrangement. The DC/AC converter 9 may also be controlled by the electronic battery management system 7, which is symbolized by the control signal $S_w$.

By way of the third winding 8, the electric energy supplied by the external energy source 10 can be fed into the transformer 4 and can be intermediately stored in the first winding 5. By closing the switch $S_0$, the fed energy can then be supplied to the cell arrangement 2. As an alternative, the energy from the external energy source may be fed in a targeted manner to one of the battery cells 3a-3e by closing one of the switches $S_1$-$S_5$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A battery system, comprising:
    a cell arrangement including several battery cells electrically connected in series;
    a transformer comprising a first winding, several second windings, and a third winding, wherein:
        the first winding of the transformer is electrically connectable in parallel with the cell arrangement,
        each second winding is electrically connectable in parallel with a respective one of the several battery cells, and
        the third winding is electrically coupled to feed energy from an external energy source to the transformer such that the energy is intermediately stored in the first winding.

2. The battery system according to claim 1, further comprising a solar cell arrangement as the external energy source.

3. The battery system according to claim 1, further comprising a first switch configured such that the first winding is connectable in parallel with the cell arrangement via the first switch.

4. The battery system according to claim 2, further comprising a first switch configured such that the first winding is connectable in parallel with the cell arrangement via the first switch.

5. The battery system according to claim 3, wherein only one second winding is assigned to each battery cell.

6. The battery system according to claim 5, further comprising second switches respectively assigned to the second windings, wherein each second winding is connectable in parallel with a corresponding battery cell via an assigned second switch.

7. The battery system according to claim 6, further comprising a converter operatively configured to connect the external energy source with the third winding.

8. The battery system according to claim 7, wherein the converter is a DC/AC converter.

9. The battery system according to claim 6, further comprising a third switch configured to connect the external energy source with the third winding.

10. The battery system according to claim 6, wherein the first switch and the second switch are semiconductor switches.

11. The battery system according to claim 10, wherein the semiconductor switches are MOSFETs.

12. The battery system according to claim 6, further comprising a microcontroller operatively configured to control the first switch and the second switches.

13. The battery system according to claim 12, wherein the microcontroller is further operatively configured to control a converter by which the external energy source is connected to the third winding.

14. A vehicle having a vehicle body component, the vehicle comprising:
    a solar cell arrangement operatively arranged on an exterior side of the vehicle body component; and
    a battery system operatively arranged in the vehicle, the battery system comprising:

a cell arrangement including several battery cells electrically connected in series;

a transformer comprising a first winding, several second windings, and a third winding, wherein:

the first winding of the transformer is electrically connectable in parallel with the cell arrangement, each second winding is electrically connectable in parallel with a respective one of the several battery cells, and the third winding is electrically coupled to feed energy from the solar cell arrangement to the transformer such that the energy is intermediately stored in the first winding.

15. The vehicle according to claim 14, wherein the solar cell arrangement is located on a roof of the vehicle.

16. The vehicle according to claim 14, wherein the cell arrangement is a high-voltage cell arrangement, having an operating voltage of more than 300 volts.

17. The vehicle according to claim 15, wherein the cell arrangement is a high-voltage cell arrangement, having an operating voltage of more than 300 volts.

* * * * *